Figure 1:
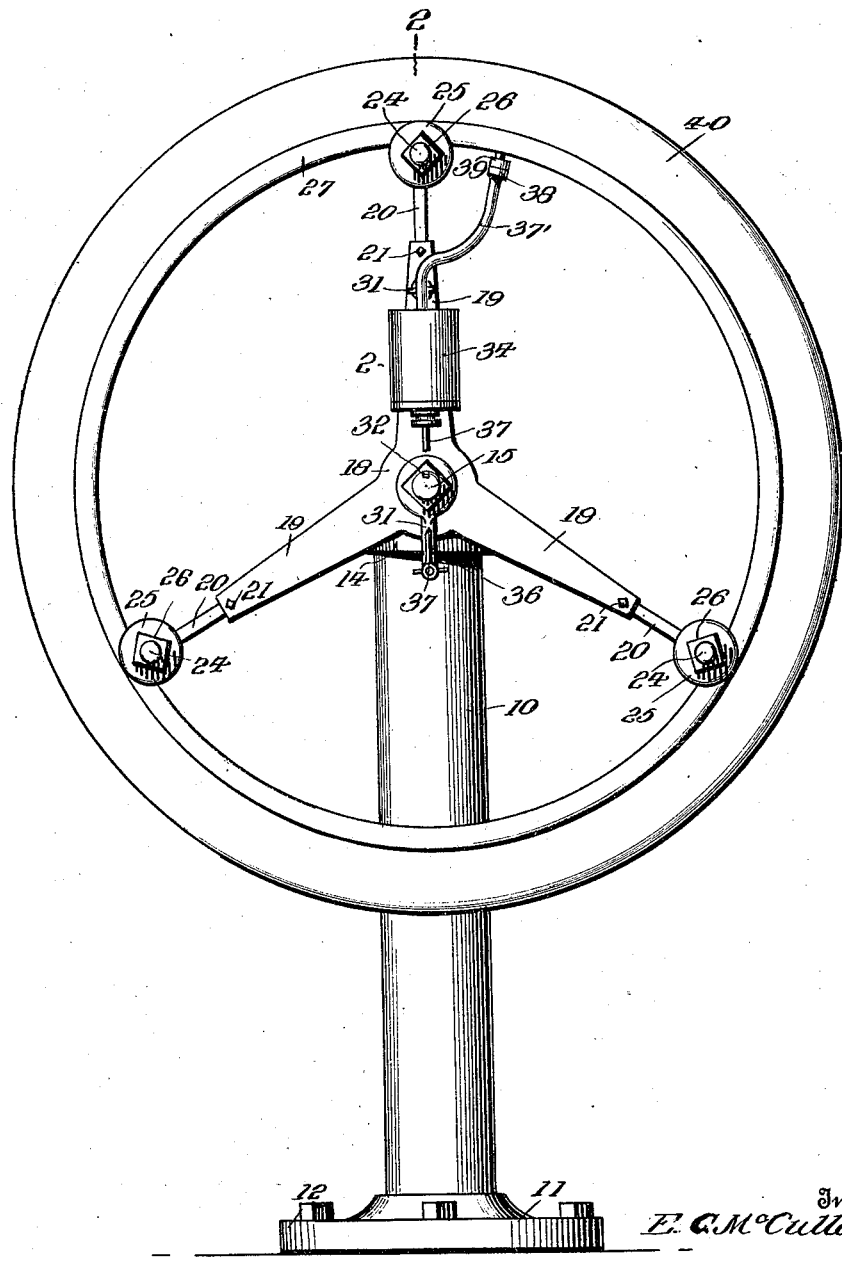

E. C. McCULLOUGH.
AUTOMOBILE RIM HOLDING AND TIRE PUMPING DEVICE.
APPLICATION FILED SEPT. 30, 1910.

996,870.

Patented July 4, 1911.
2 SHEETS—SHEET 1.

Witnesses
W. P. Woodson
Juana M. Fallin

Inventor
E. C. McCullough

By H. A. R. Lacey, Attorneys

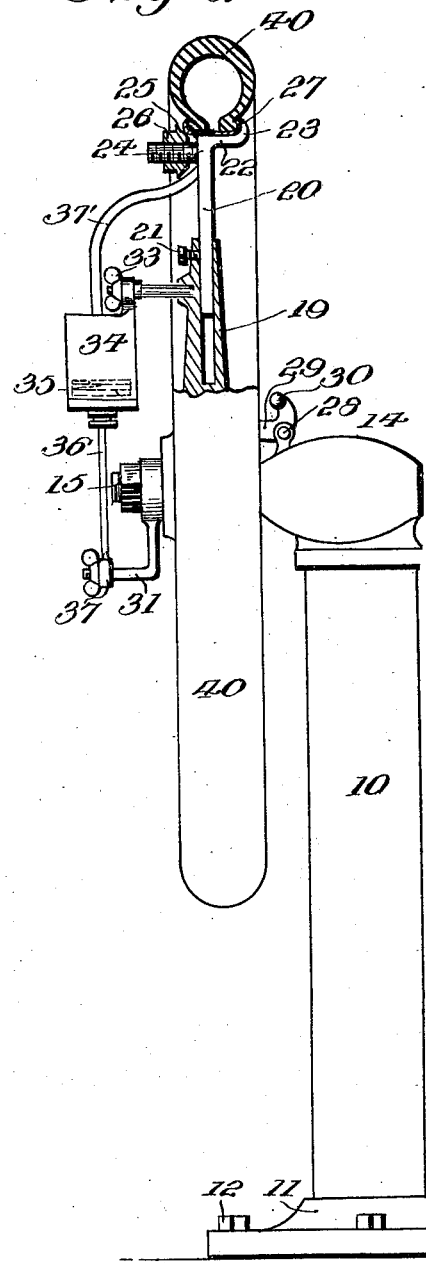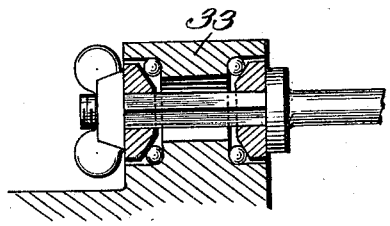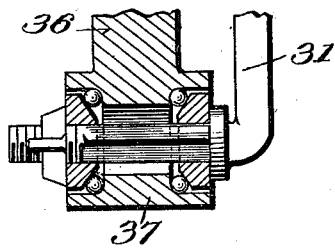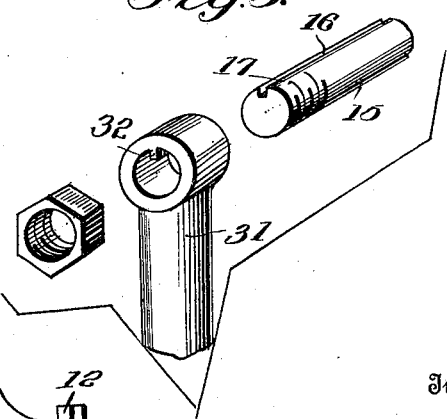

UNITED STATES PATENT OFFICE.

EDWARD CHARLES McCULLOUGH, OF GREENWICH, CONNECTICUT.

AUTOMOBILE RIM-HOLDING AND TIRE-PUMPING DEVICE.

996,870.

Specification of Letters Patent. Patented July 4, 1911.

Application filed September 30, 1910. Serial No. 584,714.

*To all whom it may concern:*

Be it known that I, EDWARD C. McCULLOUGH, a citizen of the United States, residing at Greenwich, in the county of Fairfield and State of Connecticut, have invented certain new and useful Improvements in Automobile Rim-Holding and Tire-Pumping Devices, of which the following is a specification.

This invention relates to devices employed in attaching pneumatic tires to rims, and has for one of its objects to provide a simply constructed device whereby the labor incident to applying pneumatic tires to the rims of automobile wheels is lessened, and the time required to perform the work correspondingly lessened.

Another object of the invention is to provide a device of this character whereby the application of pneumatic tires to the rims of automobile wheels is facilitated, and means provided for pumping the tire by simply rotating the improved mechanism.

With these and other objects in view the invention consists in certain novel features of construction and arrangement of the parts as hereafter shown and described and then specifically pointed out in the claim; and in the drawings is illustrated the preferred embodiment of the invention.

Figure 1 is a front elevation of the improved device with a rim and tire applied. Fig. 2 is a side elevation or edge view of the improved device with the tire and rim in section on the line 2—2 of Fig. 1. Fig. 3 is an enlarged sectional detail of the ball-bearing coupling between the pump cylinder and the revolving frame. Fig. 4 is a similar view illustrating the construction of the coupling between the piston rod of the pump and the stationary crank-arm. Fig. 5 represents detail perspective views illustrating the coupling between the crank-arm and stud.

Corresponding and like parts are referred to in the following description and indicated in all the views of the accompanying drawings by the same reference characters.

The improved device comprises a standard or supporting member 10 having a relatively large base 11, preferably secured as by bolts 12 to the floor represented at 13. At its upper end the standard 10 is enlarged as shown at 14, and supports a horizontal stub-shaft 15, the latter being provided with a longitudinal groove 16 and threaded at the outer end as shown at 17. Mounted for rotation upon the stub-shaft 15 is a supporting frame comprising a hub or center 18 and radial arms 19. Any required number of arms may be employed but generally three will be used, as shown. Each of the arms is provided with a longitudinal bore in the outer end to receive a rod 20, the rods and bores being preferably square, or other than round, so that the rods slide in the bores of the arms without turning. Each of the arms 19 is provided with a set-screw 21 to engage the rods and hold them in any required projected position. The outer end of each of the rods 20 is formed with a T-head 22 having a hooked terminal 23 at one end and with a threaded stud 24 at the other end. Mounted for rotation upon each threaded stud is a cone collar 25, and engaging the threaded stud externally of each collar is a nut 26. The T-heads 22 of the rods form supports to bear against the inner face of the rim portion of an automobile wheel, and the hooks 23 and the cone collars 25 are designed to bear against the opposite edges of the rim and thus bind it in position. An automobile wheel rim is represented conventionally at 27, and it will be obvious that when the rim is located externally of the T-heads 22 and the cone collars compressed against one side by the actuating nuts 26, the rim will be firmly clamped to the rods 20, and then by adjusting the rods outwardly and securing them in position by the set-screws 21, the rim will be firmly coupled to the rotating frame. It will also be obvious that the rim may be readily "centered" by adjusting the rods 20, so that it rotates uniformly about the stud 16.

Pivoted to swing at 28 upon the head 14 of the standard 10 is a locking arm or lever 29, the free end of the locking lever being forked as represented, and adapted to engage around one of the arms 19, or other stationary portion of the rotating frame. The lever 29 is provided with an operating arm 30, as shown. By this means the frame with the rim attached may be held stationary at any desired point, to facilitate the operations. By this means it will be obvious that a simple detachable rim holding device is produced which maintains the rim in convenient position for the application of the tire, and enables the operator to apply the tire without fatigue, or requiring the operator to work in a cramped or unusual position. The standard 10 may be of any required size to bring the rim in convenient position, and at any required distance above the floor 13. Means are also provided in the improved device for "pumping" the tire, and this portion of the apparatus includes a crank-arm 31 bearing over the stub-shaft 15 and provided with a fin or key 32 within its hub for engaging in the slot or key-way 16 so that the crank-arm is held from turning upon the stub-shaft.

Mounted to swing at 33 upon one of the arms 19 is an air-pump cylinder 34 having a piston 35 and a piston rod 36, the piston rod being coupled at 37 to the free end of the crank-arm 31. The cylinder 34 is provided with an air conductor tube 37′ having a coupling device 38 at its free end for engaging the usual valve 39 of a pneumatic tire, the latter being indicated conventionally at 40 and bearing upon the rim 27. By this simple means it will be obvious that by coupling the hose or tube 37 to the valve 39 and rotating the frame 19 with the rim 27 and tire 40 attached, the piston will be actuated within the cylinder, and the tire thus inflated. By this means the pumping operation is simplified and can be accomplished before the rim and its tire are removed from the frame.

The coupling member 33 whereby the pump cylinder 34 is pivotally united to the arm 19 is preferably formed as shown in Fig. 3 with a suitable ball-bearing, and a similar ball-bearing connection will also preferably be employed between the piston rod 36 and the crank-arm 31, as illustrated in Fig. 4.

Having thus described the invention what is claimed as new is:—

A supporting stud, a frame mounted for rotation upon said stud, a plurality of radially arranged rods movably connected to said frame, each of said rods being provided with a transverse extension having a hook at one end and a threaded stud at the other, a cone collar upon each of said threaded studs, and a nut carried by each of the threaded studs and bearing against said collars, whereby clamping means are provided for supporting a wheel-rim upon the rods.

In testimony whereof, I affix my signature in presence of two witnesses.

EDWARD CHARLES McCULLOUGH. [L. s.]

Witnesses:
THOMAS N. COOKE,
JOHN J. BUEZ.

Copies of this patent may be obtained for five cents each, by addressing the "Commissioner of Patents, Washington, D. C."